United States Patent
Wetzig et al.

(10) Patent No.: US 10,732,067 B2
(45) Date of Patent: Aug. 4, 2020

(54) DETECTING TEST GAS FLUCTUATIONS DURING SNIFFER LEAK SEARCHING

(71) Applicant: INFICON GmbH, Cologne (DE)

(72) Inventors: Daniel Wetzig, Cologne (DE); Ludolf Gerdau, Cologne (DE)

(73) Assignee: INFICON GmbH, Cologne (DE)

( * ) Notice: Subject to any disclaimer, the term of this patent is extended or adjusted under 35 U.S.C. 154(b) by 203 days.

(21) Appl. No.: 15/765,879

(22) PCT Filed: Sep. 20, 2016

(86) PCT No.: PCT/EP2016/072270
§ 371 (c)(1),
(2) Date: Apr. 4, 2018

(87) PCT Pub. No.: WO2017/060072
PCT Pub. Date: Apr. 13, 2017

(65) Prior Publication Data
US 2018/0275010 A1    Sep. 27, 2018

(30) Foreign Application Priority Data
Oct. 6, 2015    (DE) .......................... 10 2015 219 250

(51) Int. Cl.
*G01M 3/20*    (2006.01)
*G01M 3/22*    (2006.01)

(52) U.S. Cl.
CPC ............ *G01M 3/205* (2013.01); *G01M 3/226* (2013.01)

(58) Field of Classification Search
CPC .......... G01M 3/00; G01M 3/20; G01M 3/205; G01M 3/22; G01M 3/226
See application file for complete search history.

(56) References Cited

U.S. PATENT DOCUMENTS

| | | | | |
|---|---|---|---|---|
| 3,585,845 A | * | 6/1971 | Cornell | G01M 3/20 73/40.7 |
| 3,888,111 A | | 6/1975 | Craig | |
| 2003/0047465 A1 | * | 3/2003 | Grosse Bley | G01M 3/20 205/782 |
| 2010/0294026 A1 | | 11/2010 | Wetzig et al. | |

FOREIGN PATENT DOCUMENTS

| | | |
|---|---|---|
| CN | 102494848 A | 6/2012 |
| DE | 4415538 A1 | 11/1995 |
| DE | 102007043382 A1 | 3/2009 |
| EP | 0530566 A1 | 3/1993 |
| WO | 0144775 A1 | 6/2001 |

* cited by examiner

*Primary Examiner* — Nguyen Q. Ha
(74) *Attorney, Agent, or Firm* — The Webb Law Firm

(57) ABSTRACT

A method for detecting fluctuations in the amount of test gas detected by a sniffer probe of a leak detector in the gas flow from around a test piece pressurized with an oxygen-free test gas containing at least an amount of $CO_2$, wherein an amount of oxygen in the ambient air is measured.

10 Claims, 1 Drawing Sheet

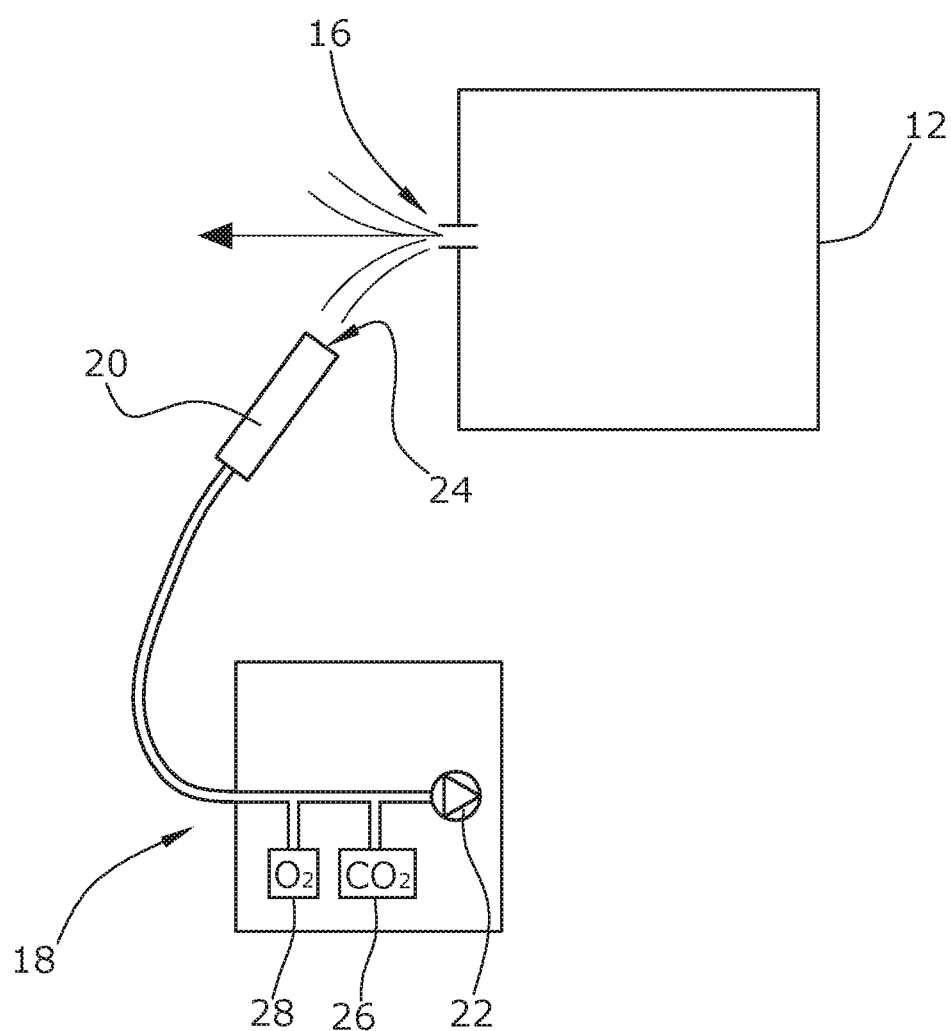

DETECTING TEST GAS FLUCTUATIONS DURING SNIFFER LEAK SEARCHING

CROSS-REFERENCE TO RELATED APPLICATIONS

This application is the United States national phase of International Application No. PCT/EP2016/072270 filed Sep. 20, 2016, and claims priority to German Patent Application No. 10 2015 219 250.4 filed Oct. 6, 2015, the disclosures of which are hereby incorporated in their entirety by reference.

BACKGROUND OF TITLE INVENTION

Field of the Invention

The invention relates to a method and to a device for detecting and compensating fluctuations in the gas flow taken in with a sniffer probe of a leak detector from the atmosphere around a test piece pressurized with $CO_2$ as test gas.

Description of Related Art

The detector may be positioned immediately at the tip of the sniffer probe, or it may be arranged in the grip or even in the main device of the leak detector upstream or downstream of the gas-supplying unit (pump, compressor). The gas-supplying unit produces the gas flow taken in by the sniffer probe.

SUMMARY OF THE INVENTION $$c = \frac{Q_{Leckage}}{Q_{FL}} \cdot (1 - c_0) + c_0$$

$Q_{Leakage}$ Test gas leak rate
$Q_{FL}$ Sniffer gas flow
$c_0$ Constant offset of test gas in the air
$c$ Effective $CO_2$ concentration in the sniffer gas flow
$c_0$ is therefore the starting concentration of the test gas in the intake gas flow (carrier gas flow). $c$ is the test gas concentration that contains the amount of test gas escaping from the leak. $Q_{Leakage}$ is the escape rate of the test gas at the leak. $Q_{FL}$ may also be called the carrier gas flow.

Sniffer leak detection when using the test gas $CO_2$ is strongly negatively influenced by the $CO_2$ fluctuations in the ambient concentration. The $CO_2$ concentration of "fresh air" is about 400 ppm. However, this concentration is increased by various $CO_2$ emitters, for instance breathing gas of users, exhaust gas from internal combustion engines, etc.

Oxygen is used when fats, proteins, and carbohydrates are burned in the body of the user; for example, the chemical reaction equation for oxidation of glucose (sugar) is: $C_6H_{12}O_6 + 6\ O_2 \rightarrow 6\ CO_2 + 6\ H_2O +$ energy.

This instability in the ambient concentration profoundly limits the smallest detectable leak rate.

The underlying object of the invention is to detect fluctuations in test gas in the gas flow taken in with a sniffer probe of a leak detector.

A gas that is as free of oxygen as possible and that has an amount of $CO_2$ is used for the test gas. In addition to $CO_2$, the test gas may also have other amounts that are oxygen-free. The test gas may be $CO_2$ in particular. What is critical is that an oxygen amount in the test piece filled with test gas is negligible or does not exist.

The invention is thus based on the underlying thought of detecting the amount of oxygen in the atmosphere around the test piece and where possible in the intake gas flow of the sniffer probe. This oxygen amount is to act as evidence of that amount of $CO_2$ in the intake gas flow that does not result from a leak in the test piece. In addition, it may be assumed by approximation that a decrease in the oxygen concentration in the ambient atmosphere is proportional to a corresponding increase in the $CO_2$ concentration. The measurement may be performed with a mass spectrometer or another sensor that measures the test gas partial pressure. The measurement of the amount of oxygen is preferably performed using a lambda probe and if possible at atmospheric pressure.

The oxygen concentration in the breath gas of the person operating the leak detector is less than that of the ambient atmosphere and the $CO_2$ amount is higher. If the breath gas of the person operating the equipment is taken in by the sniffer probe, the amount of $CO_2$ in the intake gas flow increases, which would lead to inaccurate measurement results if the test piece is pressurized with $CO_2$ as the test gas. The $CO_2$ probe of the leak detector cannot judge whether an amount of $CO_2$ results from a leak in the test piece or from the ambient atmosphere, for instance from the breath gas of the operator. This amount of $CO_2$ in the ambient atmosphere that corrupts the measurement and is not the result of a leak in the test piece is called the offset in the following. This offset may also result, for example, from the exhaust gas of internal combustion engines.

The amount of $O_2$ in the ambient atmosphere or in the gas flow taken in by the sniffer probe is determined using the oxygen probe. This amount of oxygen cannot come from a leak in the test piece if the test piece is filled with oxygen-free test gas, for instance, if it is filled exclusively with $CO_2$ as the test gas. Thus it is possible to determine the offset amount of $CO_2$ from the measured amount of oxygen.

This offset $c_2(t)$ constitutes a constant offset $c_0$ in the intake air and a time-dependent fluctuating offset $c_1(t)$ of test gas in the intake air. The offset $c_2(t)$ may be calculated as follows:

$Q_{Leakage}$ Test gas leak rate
$Q_{FL}$ Sniffer gas flow
$Q_{Leakage} < Q_{FL}$
$c_0; c_1; c_2 < 1$
$c$ Effective $CO_2$ concentration in the sniffer gas flow
$c_0$ Constant offset of test gas in the air
$c_1(t)$ Time-dependent offset of test gas in the air
$c_2(t) = c_o + c_1(t)$ Total offset of test gas in the air
a Ratio factor between $O_2$ concentration and $CO_2$ concentration
b Sensitivity factor $O_2$ of the lambda probe
$\Delta I$ Signal of the lambda probe
$\Delta c$ Change in the $O_2$ concentration $$\Delta c_1(t) = a \cdot \frac{1}{\Delta c_{O_2}}$$

$$\Delta c_{O_2} = b \cdot \Delta I$$

$$Q_{Leckage} = Q_{FL} \cdot \left[\frac{c - c_2(t)}{1 - c_2(t)}\right]$$

-continued $$\text{where } c_2(t) = c_0 + \frac{a}{b} \cdot \frac{1}{\Delta I(t)}$$

BRIEF DESCRIPTION OF THE DRAWINGS

An exemplary embodiment of the invention shall be explained in greater detail in view of the following FIGURE.

FIG. 1 is a schematic representation of an exemplary embodiment of the device according to the invention.

DESCRIPTION OF THE INVENTION

With reference to FIG. 1, the test piece 12 may be, for example, food packaging. The test piece 12 is pressurized with positive pressure with respect to the ambient atmosphere 14 and filled oxygen-free with at least $CO_2$ test gas. The test gas flows out through a leak 16 due to the positive pressure relative to the ambient atmosphere 14.

The leak detector 18 works according to the principle of sniffer leak detection and to this end has a sniffer probe 20 that is connected to a pump 22 or a compressor 22.

The pump 22 or compressor 22 produces a gas flow that is taken in through the inlet 24 of the sniffer probe 20. The leak detector 18 furthermore has a partial pressure sensor 26, in the form of a mass spectrometer, that reacts to $CO_2$ and that determines the amount of $CO_2$ test gas in the intake gas flow of the sniffer probe 20. If the sniffer probe 20 is moved along the outer surface of the test piece 12 towards the leak 16, the amount of test gas in the intake gas flow increases, which may be detected using the partial pressure sensor 26.

The amount of $CO_2$ in the intake gas flow may rise for other reasons, however, for instance if the breath gas of the person moving the sniffer probe 20 is taken in by the sniffer probe or if the sniffer probe 20 is disposed in the vicinity of an exhaust gas flow of an internal combustion engine. In this case, the partial pressure sensor 26 detects a rising amount of $CO_2$. In order to prevent this from incorrectly being understood as suggesting a leak 16 in the test piece 12, according to the invention an oxygen sensor 28 that measures the amount of $O_2$ in the intake air flow is provided.

The oxygen sensor 28 may be a sensor that detects the partial pressure of oxygen, a mass spectrometer, for example, or it may even be, for example, a conventional lambda probe.

The oxygen sensor 28 in the depicted exemplary embodiment is arranged in the gas flow between the sniffer probe 20 and the pump 22. Alternatively, the oxygen sensor may be provided directly in the grip 20 or may measure the exhaust gas flow of the pump 22 at its outlet.

The amount of oxygen measured is used to detect that amount of $CO_2$ in the intake gas flow that does not derive from a leak 16 in the test piece 12, but rather results from combustion of oxygen.

The invention claimed is:

1. A method comprising detecting fluctuations in an amount of test gas detected by a sniffer probe of a leak detector in a gas flow from ambient air surrounding a test piece pressurized with an oxygen-free test gas containing at least an amount of $CO_2$, wherein detecting the fluctuations in an amount of test gas comprises:
measuring an amount of $CO_2$ in the gas flow from ambient air,
measuring an amount of oxygen in the gas flow from ambient air, and
detecting the fluctuations in the amount of test gas based on the measured amount of $CO_2$ and the measured amount of oxygen.

2. The method according to claim 1, wherein the amount of oxygen measured is used to determine an amount of $CO_2$ in the ambient air that does not result from a leak in the test piece.

3. The method according to claim 1, wherein the measurement of the amount of oxygen in the ambient air surrounding the test piece is taken at atmospheric pressure.

4. The method according to claim 1, wherein the amount of oxygen in the gas flow of the sniffer probe or an exhaust gas flow of a gas-conveying pump of the leak detector connected to the sniffer probe is measured.

5. The method according to claim 1, wherein an offset $c_2$ (t) of the amount of test gas that is contained in an intake gas flow and that does not derive from a leak in the test piece is determined using the equation:

$$c_2(t) = c_0 + c_1(t), \text{ where } c_1(t) = \frac{a}{b} \cdot \frac{1}{\Delta I(t)},$$

wherein $c_0$ is a constant offset of $CO_2$ in the intake gas flow,
$c_1$ (t) is a time-dependent offset amount of $CO_2$ in the intake gas flow,
a is a ratio factor between measured oxygen concentration and existing $CO_2$ offset concentration,
b is a sensitivity factor for the amount of oxygen measured by an oxygen probe, and
$\Delta I(t)$ is a change in a measurement signal of the oxygen probe.

6. A device for sniffer leak detection, comprising:
a sniffer probe, wherein the sniffer probe comprises a gas-conveying pump for taking in and measuring a test gas flow that flows out of a test piece and into an ambient atmosphere surrounding the test piece, wherein the test piece is pressurized with the test gas relative to the ambient atmosphere, and wherein the test gas is oxygen-free and has at least an amount of $CO_2$; and
a $CO_2$ sensor for measuring an amount of $CO_2$ in the gas flow taken in by the sniffer probe;
an oxygen sensor for measuring an amount of oxygen in the gas flow taken in by the sniffer probe; and
a detecting unit for detecting fluctuations in an amount of $CO_2$ in the gas flow taken in by the sniffer probe based on the measured amount of $CO_2$ and the measured amount of oxygen, and for deriving an actual leak rate of the test piece.

7. The device according to claim 6, wherein the oxygen sensor is arranged and embodied upstream of the pump, to measure gas flowing through the sniffer probe, or is arranged and embodied downstream of the pump, to measure an exhaust gas flow of the gas-conveying pump.

8. The device according to claim 6, wherein the oxygen sensor is a lambda probe.

9. The device according to claim 6, wherein the oxygen sensor is a sensor that detects a partial pressure of oxygen.

10. The device according to claim 9, wherein the oxygen sensor is a mass spectrometer.

* * * * *

UNITED STATES PATENT AND TRADEMARK OFFICE
CERTIFICATE OF CORRECTION

PATENT NO. : 10,732,067 B2
APPLICATION NO. : 15/765879
DATED : August 4, 2020
INVENTOR(S) : Daniel Wetzig et al.

Page 1 of 1

It is certified that error appears in the above-identified patent and that said Letters Patent is hereby corrected as shown below:

In the Claims

Column 4, Line 44, Claim 6, after "$CO_2$;" delete "and"

Signed and Sealed this
Eighth Day of December, 2020

Andrei Iancu
*Director of the United States Patent and Trademark Office*